US008609987B2

(12) United States Patent
Li et al.

(10) Patent No.: US 8,609,987 B2
(45) Date of Patent: Dec. 17, 2013

(54) HIGH VOLTAGE DIRECT CURRENT CABLE TERMINATION APPARATUS

(71) Applicants: Ming Li, Vasteras (SE); Markus Saltzer, Fislisbach (CH); Uno Gafvert, Vasteras (SE); Cecilia Forssen, Vasteras (SE); Mikael Unge, Vasteras (SE)

(72) Inventors: Ming Li, Vasteras (SE); Markus Saltzer, Fislisbach (CH); Uno Gafvert, Vasteras (SE); Cecilia Forssen, Vasteras (SE); Mikael Unge, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/683,945

(22) Filed: Nov. 21, 2012

(65) Prior Publication Data

US 2013/0081844 A1     Apr. 4, 2013

Related U.S. Application Data

(63) Continuation of application No. PCT/EP2010/057043, filed on May 21, 2010.

(51) Int. Cl.
    *H02G 15/02*     (2006.01)
(52) U.S. Cl.
    USPC .............. 174/73.1; 174/19; 174/20; 174/74 R
(58) Field of Classification Search
    USPC ................................. 174/19, 20, 73.1, 74 R
    See application file for complete search history.

(56) References Cited

U.S. PATENT DOCUMENTS

| | | | |
|---|---|---|---|
| 1,950,608 A | * | 3/1934 | Hanson .......................... 174/73.1 |
| 1,957,995 A | * | 5/1934 | Emanueli .................... 174/11 R |
| 4,738,318 A | * | 4/1988 | Boettcher et al. ............ 174/73.1 |
| 6,124,549 A | | 9/2000 | Kemp et al. |
| 7,262,367 B2 | | 8/2007 | Donzel et al. |
| 7,495,172 B2 | * | 2/2009 | Amerpohl ..................... 174/73.1 |
| 8,383,944 B2 | * | 2/2013 | Takayasu et al. ............ 174/73.1 |

(Continued)

FOREIGN PATENT DOCUMENTS

| | | |
|---|---|---|
| DE | 2922836 A1 | 12/1980 |
| DE | 3822288 A1 | 1/1990 |

(Continued)

OTHER PUBLICATIONS

International Preliminary Report on Patentability Application No. PCT/EP2010/057043 Date: Oct. 9, 2012 16 pages.

(Continued)

*Primary Examiner* — Timothy Thompson
*Assistant Examiner* — Paresh Paghadal
(74) *Attorney, Agent, or Firm* — St. Onge Steward Johnston & Reens LLC

(57) ABSTRACT

A direct current cable termination apparatus for terminating a high voltage direct current cable, the apparatus includes a current-carrying device including a terminal portion of the direct current cable, the cable at least including an electrical conductor, a electrically insulating layer located outside of the electrical conductor, and a conductive shield located outside of the insulating layer and the electrical conductor. The apparatus includes a housing including a tubular outer shell with an inner periphery, the outer shell defining a longitudinal axis and being formed by an electrically insulating and polymer-containing material. The current-carrying device extends in the axial direction of the outer shell. Along at least a part of the axial extension of the current-carrying device the outer shell extends axially with a space between its inner periphery and the current-carrying device. The housing is adapted to separate the space from an atmosphere outside the outer shell.

18 Claims, 1 Drawing Sheet

(56) References Cited

U.S. PATENT DOCUMENTS

| | | | |
|---|---|---|---|
| 8,476,526 B2 * | 7/2013 | Lichy | 174/73.1 |
| 2007/0272428 A1 * | 11/2007 | Bayon et al. | 174/73.1 |
| 2009/0071684 A1 * | 3/2009 | Zhang | 174/73.1 |

FOREIGN PATENT DOCUMENTS

| | | | | |
|---|---|---|---|---|
| DE | 19845006 C1 | 4/2000 | | |
| EP | 1736998 A1 | 12/2006 | | |
| EP | 2026438 A1 | 2/2009 | | |
| EP | 2194627 B1 | 6/2010 | | |
| JP | 2005033930 | * | 2/2003 | H01B 17/56 |
| JP | 2005033930 A | 2/2005 | | |
| JP | 2009100646 A | 5/2009 | | |
| WO | 2006015735 A1 | 2/2006 | | |
| WO | WO2008119782 | * | 3/2007 | H02G 15/02 |
| WO | 2007147755 A1 | 12/2007 | | |
| WO | 2008076058 A1 | 6/2008 | | |

OTHER PUBLICATIONS

International Search Report & Written Opinion of the International Searching Authority Application No. PCT/EP2010/057043 Completed: Feb. 27, 2012; Mailing Date: Mar. 6, 2012 10 pages.

Written Opinion of the International Preliminary Examining Authority Application No. PCT/EP2010/057043 Date: Jul. 25, 2012 6 pages.

* cited by examiner

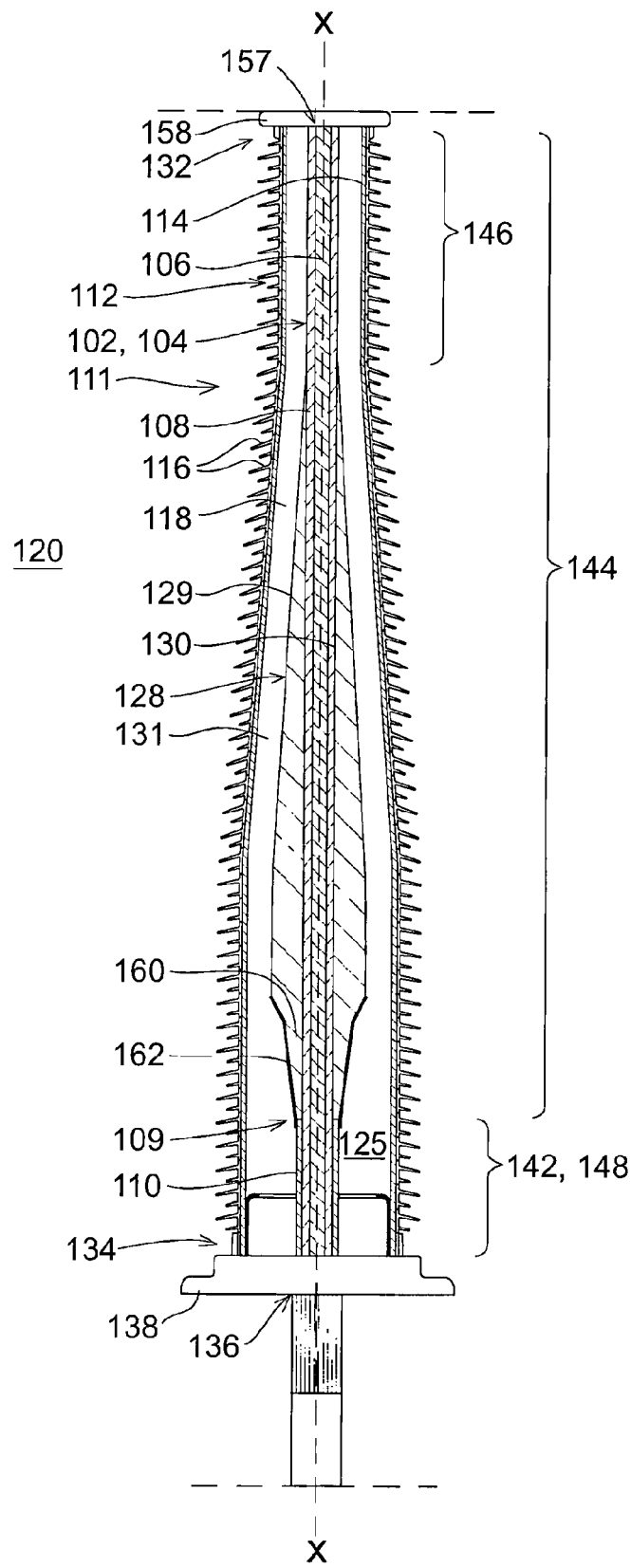

HIGH VOLTAGE DIRECT CURRENT CABLE TERMINATION APPARATUS

FIELD OF THE INVENTION

The present invention relates to a direct current cable termination apparatus for terminating a high voltage direct current, HVDC, cable. The apparatus may comprise a current-carrying device comprising a terminal portion of the direct current cable, the cable at least comprising an electrical conductor, a circumferential electrically insulating layer located outside of the electrical conductor, and a circumferential conductive shield located outside of the insulating layer and the electrical conductor. The apparatus may comprise a housing comprising a tubular outer shell with an inner periphery, the outer shell defining a longitudinal axis and being formed by an electrically insulating and polymer-containing material, and the current-carrying device is adapted to extend in the axial direction of the outer shell. Along at least a part of the axial extension of the current-carrying device the outer shell may extend axially with a space between its inner periphery and the current-carrying device, and the housing is adapted to separate the space from an atmosphere outside the outer shell. The space may be filled with an electrically insulating fluid, and the outer shell has a first end portion and a second end portion. Further, the present invention relates to an electric installation comprising an apparatus of the above-mentioned kind.

BACKGROUND OF THE INVENTION

Today, the level of the rated voltage of high voltage direct current, HVDC, applications is increased in the technical field of HVDC. With this development, improved HVDC cable terminations, which can withstand higher voltage levels, are required.

A HVDC cable is used for power supply in power distribution networks and power transmission networks. Generally, the HVDC cable comprises at least an inner or central live electrical conductor, e.g. made of copper or aluminium, an electrically insulating layer which circumferentially surrounds the electrical conductor, and a conductive shield, also called outer semicon, which circumferentially surrounds the insulating layer and the electrical conductor, the conductive shield being held on ground potential. Additional layers may be provided, e.g. a so called inner semicon, which is a conductive layer circumferentially surrounding the electrical conductor and located inside of the insulating layer, and an outer cable jacket circumferentially surrounding the conductive shield.

When the HVDC cable is electrically connected to other electric equipment, the HVDC cable is terminated or cut off. When terminating a HVDC cable, measures should be taken to ensure durable and reliable electrical performance and to protect the connection between the end of the HVDC cable and the electric equipment to which the end of cable is connected. When terminating a HVDC cable, the conductive shield and the electrically insulating layer, and possibly any further present layers, are terminated, or cut off, prior to the termination of the inner electrical conductor in order to expose the electrical conductor and connect it to the electric equipment.

WO20071147755-A1 discloses a cable termination for terminating a HVDC cable, the termination being provided with a device for electric field control including a field grading material layer adapted to be electrically connected to a live high voltage part and electrically connected to ground potential.

US2009/0071684-A1 describes a high voltage power cable termination.

WO2006/015735-A1 discloses an open-air cable sealing end for a high-voltage cable, comprising an outer shell and an electrically conducting connecting line, the outer shell extending axially with a space between its inner periphery and the connecting line, and the space is filled with an electrically insulating gas, e.g. sulphur hexafluoride, $SF_6$.

SUMMARY OF THE INVENTION

One object of the present invention is to provide an improved high voltage direct current, HVDC, cable termination, which may withstand high voltage levels. It is a further object of the present invention to improve the electric insulation properties of a HVDC cable termination. It is also an object of the present invention to improve the mechanical performances of a HVDC cable termination.

The above-mentioned object of the present invention may be attained by providing a direct current cable termination apparatus for terminating a high voltage direct current cable (a DC cable for voltages at e.g. 50 kV and above), the apparatus comprises a current-carrying device comprising a terminal portion of the direct current cable, the cable at least comprising an electrical conductor, a circumferential electrically insulating layer located outside of the electrical conductor, and a circumferential conductive shield located outside of the insulating layer and the electrical conductor, a housing comprising a tubular outer shell with an inner periphery, the outer shell defining a longitudinal axis and being formed by an electrically insulating and polymer-containing material, the current-carrying device being adapted to extend in the axial direction of the outer shell, along at least a part of the axial extension of the current-carrying device the outer shell extends axially with a space between its inner periphery and the current-carrying device, the housing is adapted to separate the space from an atmosphere outside the outer shell, and the space is filled with an electrically insulating fluid, the outer shell has a first end portion and a second end portion, wherein the conductive shield terminates inside the outer shell, a geometric field control body formed by an electrically insulating and polymer-containing material is provided inside the outer shell, the geometric field control body is positioned around the current-carrying device and extends axially along at least a part of the axial extension of the current-carrying device, the geometric field control body adjoins the termination of the conductive shield and contributes to separate the termination of the conductive shield from the space, and along at least a part of the axial extension of the geometric field control body the outer shell extends axially with a gap between its inner periphery and the geometric field control body.

Generally, the first end portion may be adjacent to the high voltage side, e.g. an overhead line, or the electric equipment to which the cable is to be connected, and the cable enters the termination apparatus via the second end portion.

The circumferential conductive shield, also called outer semicon or screen, terminates inside the outer shell and forms a termination in the form of a circumferential edge (also called semicon edge). The inventors of the present invention have identified the termination of the circumferential conductive shield, also called outer semicon, which generally is held on ground potential, as a main problem zone, where the highest electric field and electric field stress may be found. Therefore, according to the present invention, the geometric field control body may be positioned around the termination of the conductive shield. By separating the termination of the conductive shield from the fluid-filled space which extends to the first end portion of the outer shell, the first end portion being adjacent to the high voltage side, an efficient control of the electric field and a reduction of the electric field stress are attained, and the cable termination according to the present invention is more flexible and may be tailored in an efficient way to various DC termination applications. With reference to the above, an improved cable termination for high voltage is provided, which withstands higher voltage levels, and where the electric insulation properties and the mechanical performances are improved.

The insulating fluid may be in the form of a liquid, e.g. oil or gel, a gas, or a gas mixture etc.

The electrically insulating and polymer-containing material of the outer shell may comprise one polymer or a plurality of polymers. The material may be a composite, a reinforced epoxy or a resin. The polymer can be a thermoplastic polymer, e.g. polybutylene terephthalate (PBT) or polyester, or a thermosetting polymer, e.g. thermosetting resin. The outer shell may be in the form of an epoxy reinforced structure. According to an advantageous embodiment of the apparatus according to the present invention, the outer shell is formed by a polymer or a plurality of polymers. The outer shell may be provided with an outer cover of silicone, e.g. in the form of sheds, or wings.

The DC cable may comprise further layers, e.g. an outer cable jacket circumferentially surrounding the conductive shield, which is known to the skilled person and thus not discussed in more detail hereinafter.

According to a further advantageous embodiment of the apparatus according to the present invention, the current-carrying device comprising a terminal portion of a High Voltage Direct Current, HVDC, cable. Generally, the conductive shield is held on ground potential.

The apparatus according to the present invention is especially advantageous for terminating DC cables for voltages above 200 kV.

According to an advantageous embodiment of the apparatus according to the present invention, the fluid comprises an electrically insulating gas. The insulating gas may be a gas mixture. Insulating gas, e.g. $SF_6$, $CO_2$ or $N_2$, is easy to handle on site, has a low weight and has an advantageous convection cooling effect. By separating the termination of the conductive shield from the gas-filled space, the problem zone, in the form of the conductive shield termination, is also separated from the gas-filled space adjacent to the high voltage side. Hereby, the risk of electrical breakdown in the electrically insulating gas of the space is decreased, and an improved electric field control is provided. By this embodiment, an improved HVDC cable termination is provided, where the electric insulation properties and the mechanical performances are improved.

According to a further advantageous embodiment of the apparatus according to the present invention, the electrically insulating gas comprises $SF_6$, i.e. sulphur hexafluoride, $CO_2$ and/or $N_2$. By this embodiment, the insulation properties and the electric field control of the HVDC cable termination are further improved, providing a further improved HVDC cable termination. The electrically insulating gas may also comprise air, e.g. compressed air.

According to another advantageous embodiment of the apparatus according to the present invention, along the entire axial extension of the geometric field control body the outer shell extends axially with the gap between its inner periphery and the geometric field control body. By this embodiment, a further improved electric field control is provided, whereby a further improved HVDC cable termination is attained.

According to yet another advantageous embodiment of the apparatus according to the present invention, the geometric field control body is fitted around the terminal portion of the cable. By this embodiment, a yet further improved electric field control is provided, whereby an improved HVDC cable termination is attained.

According to an advantageous embodiment of the apparatus according to the present invention, the geometric field control body extends along at least a part of the axial extension of the current-carrying device from the termination of the conductive shield in the direction toward the first end portion of the outer shell. By this embodiment, a further improved electric field control is provided, whereby an improved HVDC cable termination is attained.

According to a further advantageous embodiment of the apparatus according to the present invention, a first part of the terminal portion of the cable has the circumferential conductive shield, whereas a remainder part of the terminal portion of the cable has the conductive shield removed, the first part being situated between the second end portion of the outer shell and the termination of the conductive shield, and the remainder part of the terminal portion of the cable extends from the termination of the conductive shield to the first end portion of the outer shell. By this embodiment, a further improved HVDC cable termination is attained.

According to another advantageous embodiment of the apparatus according to the present invention, the electrical conductor of the terminal portion of the cable is terminated outside the outer shell. By this embodiment, the electric field control is further improved.

Alternatively, the current-carrying device may comprise a connecting body positioned within the outer shell and in which the electrical conductor terminates, the connecting body being adapted to electrically connect the terminated electrical conductor to an electrically conducting member. The conducting member is in turn adapted to extend axially from the connecting body to the first end portion of the outer shell to form part of the current-carrying device. The connecting body may comprise connecting elements which connect the terminated electrical conductor to the conducting member and may comprise screws and a static conductive screen/shield. The conducting member may be in the form of a rod, e.g. made of aluminium or copper. Having a bare conducting member in the space of the outer shell, which is gas-filled, e.g. with $SF_6$, is of benefit to the thermal performance of the DC cable termination.

According to yet another advantageous embodiment of the apparatus according to the present invention, the electrically insulating layer of the terminal portion of the cable is terminated outside the outer shell. By this embodiment, the electric field control is further improved.

According to still another advantageous embodiment of the apparatus according to the present invention, the geometric field control body is made of a polymer or a plurality of polymers. By this embodiment, an improved electric field control is provided, whereby a further improved HVDC cable termination is attained.

According to an advantageous embodiment of the apparatus according to the present invention, the geometric field control body is made of a rubber material. By this embodiment, an improved electric field control is provided, whereby an improved HVDC cable termination is attained.

According to an advantageous embodiment of the apparatus according to the present invention, the geometric field control body is made of an ethylene propylene diene monomer, EPDM, material, or a cross-linked polyethylene, XLPE, material. By this embodiment, an improved electric field control is provided, whereby an improved HVDC cable termination is attained. However, other suitable materials may also be used.

According to another advantageous embodiment of the apparatus according to the present invention, the geometric field control body comprises nonlinear resistive field grading material with a resistivity which is a function of the electric field. By this embodiment, an improved electric field control is provided, whereby an improved HVDC cable termination is attained. A field grading material is a material adapted to grade or to guide the electric field. Examples of so called field grading material, FGM, which can be used for the embodiments of the apparatus according to the present invention are for example mentioned in WO-A1-2008/076058 and EP-A1-1 736 998. However, other suitable FGM may also be used.

According to a further advantageous embodiment of the apparatus according to the present invention, the geometric field control body is tapered towards the first end portion of the outer shell. By this embodiment, a further improved electric field control is provided, whereby an improved HVDC cable termination is attained.

According to another advantageous embodiment of the apparatus according to the present invention, the geometric field control body is tapered towards the second end portion of the outer shell. By this embodiment, a yet further improved electric field control is provided, whereby a further improved HVDC cable termination is attained.

According to yet another advantageous embodiment of the apparatus according to the present invention, the geometric field control body forms an end portion in the direction toward the second end portion of the outer shell, the end portion of the geometric field control body being fitted into a tubular deflector shell made of an electrically conducting material. By this embodiment, an improved electric field control is provided, whereby an improved HVDC cable termination is attained.

According to another advantageous embodiment of the apparatus according to the present invention, the termination of the conductive shield is enclosed by the geometric field control body, the tubular deflector shell and the electrically insulating layer of the terminal portion of the cable. By this embodiment, an improved electric field control is provided, whereby a further improved HVDC cable termination is attained.

According to yet another advantageous embodiment of the apparatus according to the present invention, the termination of the conductive shield is enclosed by the geometric field control body and the electrically insulating layer of the terminal portion of the cable. By this embodiment, an improved electric field control is provided, whereby a further improved HVDC cable termination is attained.

According to still another advantageous embodiment of the apparatus according to the present invention, along at least a part of the axial extension of the current-carrying device the geometric field control body has a radial extension which is at least twice as large as the radial extension of the insulating layer of the terminal portion of the cable. By this embodiment, an improved electric field control is provided, whereby an improved HVDC cable termination is attained.

According to an advantageous embodiment of the apparatus according to the present invention, along at least a part of the axial extension of the current-carrying device the geometric field control body has a radial extension which is larger than the radial extension of the terminal portion of the cable. By this embodiment, a yet further improved electric field control is provided, whereby an improved HVDC cable termination is attained.

According to a further advantageous embodiment of the apparatus according to the present invention, the geometric field control body extends along at least $\frac{1}{3}$ of the current-carrying device's axial extension inside the outer shell. By this embodiment, an improved electric field control is provided, whereby an improved HVDC cable termination is attained. Advantageously, the geometric field control body extends along at least $\frac{2}{3}$ of the current-carrying device's axial extension inside the outer shell, providing a further improved electric field control. Advantageously, the geometric field control body extends along at least $\frac{1}{2}$ of the current-carrying device's axial extension inside the outer shell, providing a yet further improved electric field control.

Further, the above-mentioned objects of the present invention may be attained by providing an electric installation, comprising a high voltage direct current cable which at least comprises an electrical conductor, a circumferential insulating layer located outside of the electrical conductor, and a circumferential conductive shield located outside of the insulating layer and the electrical conductor, and comprising a direct current cable termination apparatus for terminating the cable. Positive technical effects of the electric installation according to the present invention, and its embodiments, correspond to the above-mentioned technical effects mentioned in connection with the apparatus according to the present invention, and its embodiments.

The above-mentioned embodiments and features of the direct current cable termination apparatus and the electric installation, respectively, may be combined in various possible ways providing further advantageous embodiments.

Further advantageous embodiments of the direct current cable termination apparatus and the electric installation, respectively, according to the present invention and further advantages with the present invention emerge from the detailed description of embodiments.

BRIEF DESCRIPTION OF THE DRAWINGS

The present invention will now be described, for exemplary purposes, in more detail by way of embodiments and with reference to the enclosed drawings, in which:

FIG. 1 is a schematic side view showing a longitudinal section of an embodiment of the direct current cable termination apparatus according to the present invention, illustrating several aspects of the apparatus according to the present invention.

DETAILED DESCRIPTION OF THE INVENTION

FIG. 1 schematically shows an embodiment and aspects of the direct current cable termination apparatus according to the present invention, for terminating a HVDC cable for high voltage (e.g. 10 kV and above, especially 50 kV and above). With reference to FIG. 1, the embodiment of the apparatus includes a current-carrying device 102, or a voltage-carrying device, comprising a terminal portion 104 of the HVDC cable, the cable at least comprising a central live electrical conductor 106, generally made of a suitable metal, e.g. copper or aluminium, a circumferential electrically insulating layer 108 which circumferentially surrounds and is located outside of the electrical conductor 106, and a circumferential conductive shield 110, or layer/screen, also called outer semicon, which circumferentially surrounds and is located outside of the insulating layer 108 and the electrical conductor 106. The circumferential conductive shield 110 may be made of an electrically conducting polymer. The structure of a HVDC cable and its parts, which may comprise further layers, is well known to the skilled person and thus not discussed in more detail herein. The HVDC cable may e.g. comprise a so called inner semicon, which is a layer/screen circumferentially surrounding the electrical conductor and being located inside of the insulating layer. The inner semicon may be made of an electrically conducting polymer.

Further, the apparatus comprises a housing 111 which comprises a tubular outer shell 112 with an inner periphery 114. The outer shell 112 defines a longitudinal axis x-x and is formed by an electrically insulating and polymer-containing material, e.g. a composite. The apparatus is substantially rotation symmetric around the axis x-x. The outer periphery of the outer shell 112 is provided with sheds 116, or lips/wings, for example made of silicone. The current-carrying device 102 is adapted to extend in the axial direction of the outer shell 112. Along at least a part of the axial extension of the current-carrying device 102 the outer shell 112 extends axially with a space 118 between its inner periphery 114 and the outer periphery of current-carrying device 102. The housing 111 is adapted to separate the space 118 from an atmosphere outside 120 the outer shell 112. The space 118 is filled with an electrically insulating fluid 125 in the form of an electrically insulating gas, e.g. SF6 or N2, or a mixture thereof. The conductive shield 110 terminates inside the outer shell 112. The conductive shield 110 is terminated and forms a termination 109 in the form of a circumferential edge (also called semicon edge). The apparatus includes a geometric field control body 128 which is formed by an electrically insulating and polymer-containing material and is provided inside the outer shell 112 in the proximity of the termination 109 of the conductive shield 110. The geometric field control body 128 is positioned around the current-carrying device 102, more precisely around the terminal portion 104 of the DC cable, and extends axially along at least a part of the axial extension of the current-carrying device 102. The geometric field control body 128 has an outer periphery 129 facing the space 118 and an inner periphery 130 facing the current-carrying device 102. The geometric field control body 128 adjoins the termination 109 of the conductive shield 110 and may separate, or may contribute to separate, the termination 109 of the conductive shield 110 from the space 118. Along at least a part of the axial extension, or even the entire axial extension, of the geometric field control body 128 the outer shell 112 extends axially with a gap 131 between its inner periphery 114 and outer periphery 129 of the geometric field control body 128. The geometric field control body 128 may be fitted around the terminal portion 104 of the cable by being stretched or pushed, over the current-carrying device 102, more precisely the terminal portion 104 of the HVDC cable. Alternatively, the geometric field control body 128 may be moulded or casted onto the current-carrying device 102, more precisely onto the terminal portion 104 of the DC cable. The electric field control member 128 may be made of an ethylene propylene diene monomer, EPDM, material, or a cross-linked polyethylene, XLPE, material. The geometric field control body 128 may be made of the same material as the insulating layer 108 of the terminal portion 104 of the cable.

The outer shell 112 has a first end portion 132 adjacent to the high voltage side, where the apparatus is connected to e.g. an overhead line or bus bar etc. The outer shell 112 has a second end portion 134 via which the HVDC cable enters the outer shell 112. The housing 111 may comprise a first flange 138, e.g. made of a metal, at the second end portion 134 of the outer shell 112, and a second flange 158, e.g. made of a metal, at the first end portion 132 of the outer shell 112. The cable enters the outer shell 112 via a first opening 136 defined by the first flange 138. The electrically insulating layer 108 and the electrical conductor 106 of the terminal portion 104 of the cable exit the outer shell 112 via a second opening 157 defined by the second flange 158 and are terminated outside 120 of the outer shell 112, for connection of the electrical conductor 106 to electric equipment of the high voltage side. The connection of the electrical conductor 106 to the electric equipment is effected in ways known to the skilled person. A first part 142 of the terminal portion 104 of the cable has the circumferential conductive shield 110, whereas a remainder part 144 of the terminal portion 104 of the cable has the conductive shield 110 removed, such that the insulating layer 108 is exposed. The first part 142 may be called semicon end and the remainder part 144 may be called stripped cable. The remainder part 144 of the terminal portion 104 of the cable extends from the termination 109 of the conductive shield 110 to the first end portion 132 of the outer shell 112. The first part 142, with the conductive shield 110 present, is situated between the second end portion 134 and the termination 109 of the conductive shield 110. The geometric field control body 128 may be located at a first axial range 146 from the first end portion 132 of the outer shell 112 and at a second axial range 148 from the second end portion 134 of the outer shell 112. Alternatively, the geometric field control body 128 may extend to the first end portion 132 of the outer shell 112.

The geometric field control body 128 may extend along at least a part of the axial extension of the current-carrying device 102 from the termination 109 of the conductive shield 110 in the direction toward the first end portion 132 of the outer shell 112. In alternative embodiments, the geometric field control body 128 may extend along at least a part of the axial extension of the current-carrying device 102 from the termination 109 of the conductive shield 110 in the direction toward the second end portion 134 of the outer shell 112. The geometric field control body 128 may be tapered towards the first end portion 132 of the outer shell 112, and the geometric field control body 128 may be tapered towards the second end portion 134 of the outer shell 112. The geometric field control body 128 forms an end portion 160 in the direction toward the second end portion 134 of the outer shell 112. The end portion 160 of the geometric field control body 128 is fitted into a circumferential tubular deflector shell 162 made of an electrically conducting material.

In the embodiment shown, the termination 109 of the conductive shield 110 is electrically connected to the deflector shell 162, and the termination 109 of the conductive shield 110 is enclosed by the geometric field control body 128, the tubular deflector shell 162 and the electrically insulating layer 108 of the terminal portion 104 of the cable. In the embodiment shown, along at least a part of the axial extension of the conductive shield 110, the tubular deflector shell 162 is positioned around and outside of the conductive shield 110. Consequently, the tubular deflector shell 162 overlaps a portion of the conductive shield 110. Alternatively, the termination 109 of the conductive shield 110 may be positioned between the inner periphery 130 of the geometric field control body and the electrically insulating layer 108 of the terminal portion 104 of the cable, and the termination 109 of the conductive shield 110 may thus be enclosed by the geometric field control body 128 and the electrically insulating layer 108 of the terminal portion 104 of the cable. Alternatively, the tubular deflector shell 162 may be positioned without overlapping a portion of the conductive shield 110.

Along at least a part of the axial extension of the current-carrying device 102 the geometric field control body 128 may have a radial extension which is larger than the radial extension of the terminal portion 104 of the cable. The geometric field control body 128 may extend along at least ½ of the current-carrying device's 102 axial extension inside the outer shell 112. The dimensions of the geometric field control body 128 may be tailored for the specific HVDC termination in question and for the electric equipment to which the terminated DC cable is to be connected.

The invention shall not be considered limited to the embodiments illustrated, but can be modified and altered in many ways by one skilled in the art, without departing from the scope the appended claims. For example, the shape of the geometric field control body, the shape of the outer shell, and the size of the geometric field control body in relation to the size of the outer shell may be altered in many ways.

What is claimed is:

1. A direct current cable termination apparatus for terminating a high voltage direct current cable, the apparatus comprises a current-carrying device comprising a terminal portion of the direct current cable, the cable at least comprising an electrical conductor, a circumferential electrically insulating layer located outside of the electrical conductor, and a circumferential conductive shield located outside of the insulating layer and the electrical conductor, a housing comprising a tubular outer shell with an inner periphery the outer shell defining a longitudinal axis and being formed by an electrically insulating and polymer-containing material, the current-carrying device being adapted to extend in the axial direction of the outer shell, along at least a part of the axial extension of the current-carrying device the outer shell extends axially with a space between its inner periphery and the current-carrying device, the housing is adapted to separate the space from an atmosphere outside the outer shell, and the space is filled with an electrically insulating fluid the outer shell has a first end portion and a second end portion, characterized in that the conductive shield terminates inside the outer shell, in that a geometric field control body formed by an electrically insulating and polymer-containing material is provided inside the outer shell, in that the geometric field control body is positioned around the current-carrying device and extends axially along at least a part of the axial extension of the current-carrying device, in that the geometric field control body adjoins the termination of the conductive shield and contributes to separate the termination of the conductive shield from the space, in that along at least a part of the axial extension of the geometric field control body the outer shell extends axially with a gap between its inner periphery, and the geometric field control body, in that the geometric field control body forms an end portion in the direction toward the second end portion of the outer shell, the end portion of the geometric field control body being fitted into a tubular deflector shell made of an electrically conducting material, and in that the termination of the conductive shield is enclosed by the geometric field control body, the tubular deflector shell and the electrically insulating layer of the terminal portion of the cable.

2. The direct current cable termination apparatus according to claim 1, characterized in that the fluid comprises an electrically insulating gas.

3. The direct current cable termination apparatus according to claim 2, characterized in that the electrically insulating gas comprises $SF_6$, $CO_2$ and/or $N_2$.

4. The direct current cable termination apparatus according to claim 1, characterized in that along the entire axial extension of the geometric field control body the outer shell extends axially with the gap between its inner periphery and the geometric field control body.

5. The direct current cable termination apparatus according to claim 1, characterized in that the geometric field control body is fitted around the terminal portion of the cable.

6. The direct current cable termination apparatus according to claim 1, characterized in that the geometric field control body extends along at least a part of the axial extension of the current-carrying device from the termination of the conductive shield in the direction toward the first end portion of the outer shell.

7. The direct current cable termination apparatus according to claim 1, characterized in that a first part of the terminal portion of the cable has the circumferential conductive shield, whereas a remainder part of the terminal portion of the cable has the conductive shield removed, the first part being situated between the second end portion of the outer shell and the termination of the conductive shield, and in that the remainder part of the terminal portion of the cable extends from the termination of the conductive shield to the first end portion of the outer shell.

8. The direct current cable termination apparatus according to claim 1, characterized in that the electrical conductor of the terminal portion of the cable is terminated outside the outer shell.

9. The direct current cable termination apparatus according to claim 8, characterized in that the electrically insulating layer of the terminal portion of the cable is terminated outside the outer shell.

10. The direct current cable termination apparatus according to claim 1, characterized in that the geometric field control body is made of a polymer or a plurality of polymers.

11. The direct current cable termination apparatus according to claim 1, characterized in that the geometric field control body is made of a rubber material.

12. The direct current cable termination apparatus according to claim 1, characterized in that the geometric field control body is made of an ethylene propylene diene monomer, EPDM, material, or a cross-linked polyethylene, XLPE, material.

13. The direct current cable termination apparatus according to claim 1, characterized in that the geometric field control body is tapered towards the first end portion of the outer shell.

14. The direct current cable termination apparatus according to claim 1, characterized in that the geometric field control body is tapered towards the second end portion of the outer shell.

15. The direct current cable termination apparatus according to claim 1, characterized in that along at least a part of the axial extension of the current-carrying device the geometric field control body has a radial extension which is at least twice as large as the radial extension of the insulating layer of the terminal portion of the cable.

16. The direct current cable termination apparatus according to claim 1, characterized in that along at least a part of the axial extension of the current-carrying device the geometric field control body has a radial extension which is larger than the radial extension of the terminal portion of the cable.

17. The direct current cable termination apparatus according to claim 1, characterized in that the geometric field control body extends along at least ⅓ of the current-carrying device's axial extension inside the outer shell.

18. An electric installation, comprising a high voltage direct current cable which at least comprises an electrical conductor, a circumferential insulating layer located outside of the electrical conductor, and a circumferential conductive shield located outside of the insulating layer and the electrical conductor, and comprising a direct current cable termination apparatus for terminating the cable according to claim 1.

* * * * *